(12) United States Patent
Desai

(10) Patent No.: US 6,804,449 B1
(45) Date of Patent: Oct. 12, 2004

(54) DVD REVERSE PLAYBACK METHODS AND APPARATUS

(75) Inventor: Pratish R. Desai, Fremont, CA (US)

(73) Assignee: Genesis Microchip Inc., Alviso, CA (US)

( * ) Notice: Subject to any disclaimer, the term of this patent is extended or adjusted under 35 U.S.C. 154(b) by 0 days.

(21) Appl. No.: 09/478,055

(22) Filed: Jan. 5, 2000

(51) Int. Cl.[7] .................................................. H04N 5/91
(52) U.S. Cl. ........................................ 386/68; 386/111
(58) Field of Search ............................. 386/46, 68, 95, 386/109, 111, 125, 126; 375/240.21

(56) References Cited

U.S. PATENT DOCUMENTS

| | | | | |
|---|---|---|---|---|
| 5,751,888 A | * | 5/1998 | Fukuchi et al. ............... | 386/68 |
| 5,892,882 A | * | 4/1999 | Kuroda et al. ................ | 386/68 |
| 5,970,205 A | * | 10/1999 | Nakamura et al. ............ | 386/68 |
| 5,974,224 A | * | 10/1999 | Nagata ......................... | 386/109 |
| 6,252,906 B1 | * | 6/2001 | Canfield ................ | 375/240.21 |
| 6,356,702 B1 | * | 3/2002 | Suzuki ......................... | 386/68 |
| 6,363,207 B1 | * | 3/2002 | Duruoz et al. ................ | 386/68 |
| 6,470,051 B1 | * | 10/2002 | Campisano et al. ...... | 375/240.1 |
| 6,473,558 B1 | * | 10/2002 | Wu et al. ....................... | 36/68 |

* cited by examiner

Primary Examiner—Huy Nguyen
(74) Attorney, Agent, or Firm—Beyer Weaver & Thomas, LLP

(57) ABSTRACT

An apparatus, method, and manufacture for playing video in reverse can be implemented using frames from prior video object units. Scaling can be implemented to playback a video in reverse at a speed approaching normal forward play. A smooth shuttle can be implemented to transition between slow reverse, pause and slow forward.

12 Claims, 10 Drawing Sheets

DVD REVERSE PLAYBACK METHODS AND APPARATUS

BACKGROUND OF THE INVENTION

This invention relates generally to the field of video processing. More particularly the invention relates to the field of playing a DVD video in reverse.

In the field of video processing, a series of images or frames of video information are displayed in order so as to create a moving image. One common standard for conveying this video information is known as the MPEG standard. While the display of the video images is relatively straightforward when the images are decoded and displayed in the forward direction, displaying the images in the reverse direction has proven to be entirely more difficult. In fact, even though some video players such as the DVD player have been in existence for some time, a system for displaying a continuous reverse image has not successfully been employed.

The underlying problem that creates these difficulties is the way that a video is encoded in the first place. For example, in MPEG, a first video frame is entirely encoded. Succeeding frames are not entirely encoded. Rather, only the changes from the preceding frame are encoded. This conserves the amount of processing time required to decode an image, because the existing information from the first frame can be reused. This process is repeated every few frames such that after a few frames another frame is once again entirely encoded. The process is then carried on again based on this new reference frame.

Consequently, the data that is required to decipher the image for a frame is often cumulative over several frames. While this cumulative information is easily gathered when the video is played in the forward direction, it is not easily gathered when the video is played in reverse.

Other attempts to create a reverse playback video sequence have had various drawbacks. The first drawback is the delay involved in creating a reverse image. Namely, the delay between the user initiating a reverse mode and the actual reverse video being played has been undesirably long. It would be beneficial for a user to be able to initiate a reverse playback mode and for the system to quickly begin the reverse playback. However, with conventional systems, the delay involved to create the reverse image does not satisfy this need. Furthermore, the reverse images displayed are often choppy, such that there is not a seamless reverse playback in such systems. A further drawback of some attempts has been that once the reverse sequence has been initiated, it only plays at ½ of normal speed. It would be preferred if the system had the ability to play at normal speed (or faster) but in reverse.

The drawbacks noted above have apparently been caused by attempts by others to recreate the sequence of forward images and store them for reverse play. This takes a great deal of memory to store the video images. Since not all of the video images can be stored in the limited memory of most conventional DVD players, the speed of the reverse playback in these players has to be slowed down to accommodate the creation of additional frames of data as space for storing the new frames becomes available after already played frames are discarded.

Another drawback in video systems has been the lack of a compression system that permits the storage of sufficient information about an image with less memory than that required for the full image. It would be desirable to have a system that allows a video to be played in reverse while not requiring all of the memory for a display of the full image.

SUMMARY OF THE INVENTION

The present invention provides a system to overcome these disadvantages and satisfy the needs highlighted by other designs.

In one embodiment of the invention, a system for playing a video in reverse generates frames of a video, scales these frames, stores the scaled frames in memory; and plays the scaled frames in reverse. A decimation algorithm can be used to accomplish the scaling feature of the invention. Furthermore, the scaling of chroma and luma components for a frame can be accomplished independently of one another so as to accomplish the scaling. Reference frames from preceding video object units can be utilized to accomplish the generation of frames for a frame of a present video object unit. The invention is advantageous in that it permits a normal speed reverse playback of a video, rather than the slower playback required by conventional designs. It also can permit a faster generation of the frames for reverse playback. Similarly, it can prevent the choppy playback that occurs with some conventional designs that can not generate frames quickly enough resulting in a delay between succeeding frames in a reverse playback.

In another embodiment of the invention, a video is played in reverse by utilizing information from prior video object units to generate video frames for playback in the current video object unit. The generated frames are queued for playback and displayed in reverse order. While the queue of frames is being displayed, frames from the preceding video object unit are generated and queued for display. A scaling algorithm can be utilized to reduce the amount of memory required for storage of a frame.

In yet another embodiment of the invention, an apparatus is provided that utilizes a memory to store a scaled version of a video frame in order to permit reverse playback of the video.

Another embodiment of the invention provides a system for playing a DVD video by playing the DVD in a slow reverse speed, pausing the DVD video and playing the DVD video in slow forward speed.

Other and further advantages and features of the invention will be apparent to those skilled in the art from a consideration of the following description taken in conjunction with the accompanying drawings wherein certain methods of and installations for practicing the invention are illustrated. However, it is to be understood that the invention is not limited to the details disclosed but includes all such variations and modifications as fall within the spirit of the invention and the scope of the appended claims.

BRIEF DESCRIPTION OF THE DRAWINGS

FIG. 2 shows a representation of a protocol used in generating a series of frames for a video.

FIG. 3 shows a representation of the sequence of display of the frames generated in FIG. 2.

DESCRIPTION OF THE SPECIFIC EMBODIMENTS

Figure 1:
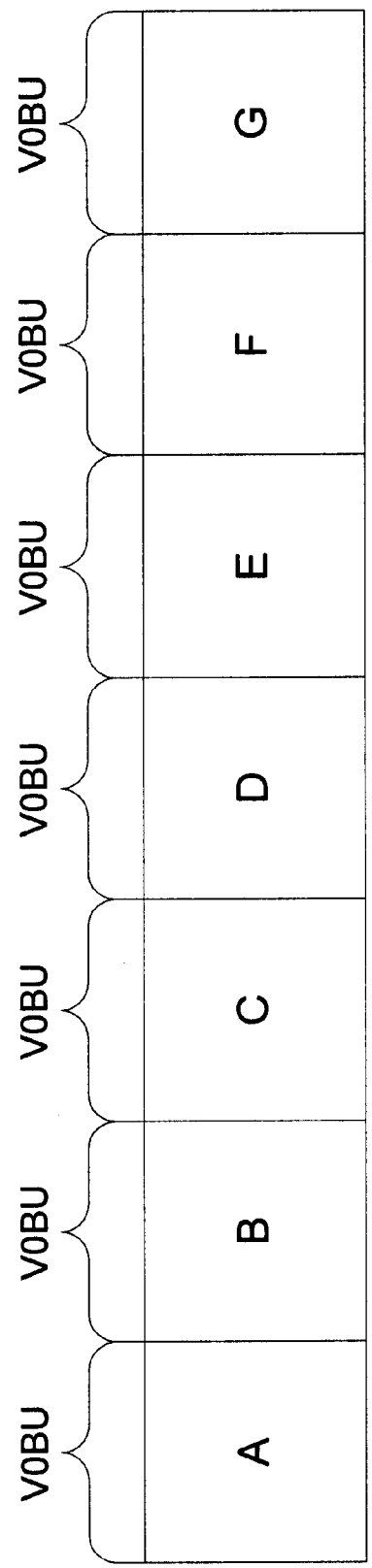
FIG. 1 shows a diagram illustrating the division of a video into a series of video object units.
Figure 3:
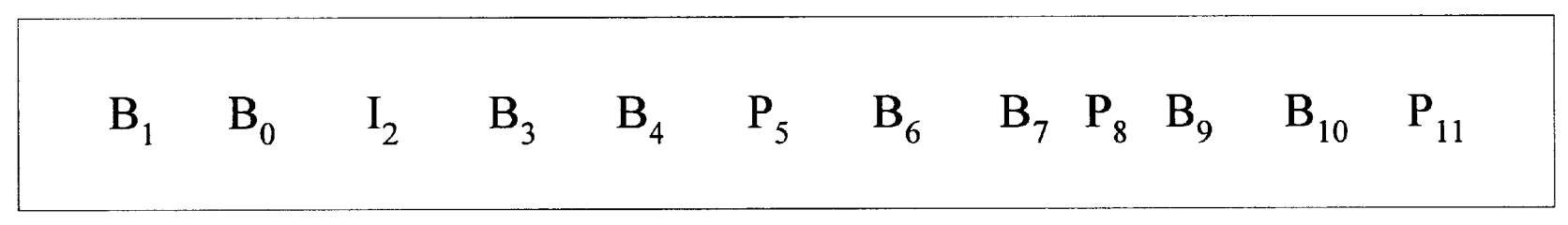

Referring now to the figures and more particularly to FIG. 1, a typical stream of video object units (VOBUs) can be seen. FIG. 1 is composed of a series of video object units labeled A through G. Each of these video object units is composed of data that can generate a sequence of frames. For example, FIG. 3 shows a sample of a video object unit that is used to play 11 successive frames. Typically, such video object units will play video at normal speed to last for a duration of between ½ and 1 ½ seconds.

As noted above, FIG. 3 shows a representation of a single video object unit (VOBU). The example shown in FIG. 3 utilizes an MPEG format to encode the video object unit. FIG. 3 shows 11 frame data portions. As one of ordinary skill in the art understands, the "B" frames utilize a preceding, following or both preceding and following "I" or "P" frame to derive the total frame content for a frame. Similarly, the "P" frames utilize a preceding "I" or "P" frame to decode their respective frame. Finally, the "I" frames stand alone in that they do not require any additional frame data to be decoded. Consequently, as FIG. 4 demonstrates, in case of an open GOP (Group of Pictures) structure in order to generate the B0 frame, one must access a preceding reference (i.e., "P" or "I") frame. If a "P" frame is encountered, it must also access the preceding "P" or "I" frame until an "I" frame is encountered. In this way the B0 frame can be created using the information from an I reference frame; the changes from the I reference frame revealed by the intervening P reference frames; and finally, the changes indicated by the B reference frame from the prior P frame (or I Frame, if no P frames exist). In this way, an image is constructed based on the foundation of the I reference frame.

Figure 4:
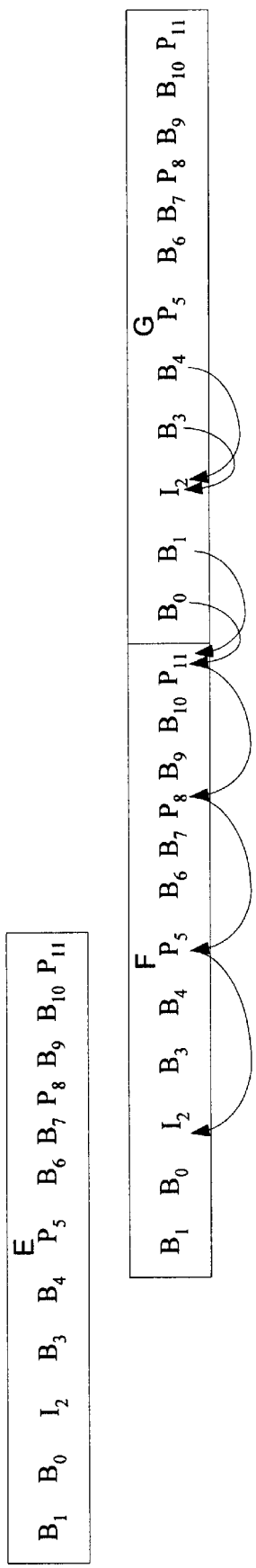
FIG. 4 shows three video object units as they are displayed in forward play with arrows designating the reference frames that are referred back to in order to generate the frame from which the arrow originates.

FIG. 4 demonstrates this process. The arrows in FIG. 4 demonstrate how for B0, one must obtain P11, P8, P5 and I2 in order to construct a frame of video. Notably, the reference frames of P11, P8, P5 and I2 are all part of a VOBU that precedes the VOBU where B0 is located.

Figure 2:
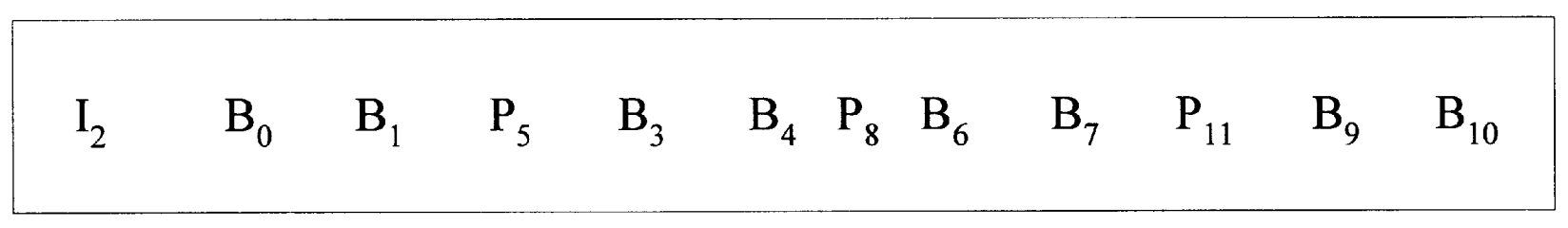

While FIG. 3 demonstrates the order in which frames of video are displayed, FIG. 2 shows the sequence in which the frame information is normally transmitted to a user, e.g., by a DVD drive. It should be noted that the sequence differs between how the frame information is transmitted and the sequence in which it is actually displayed.

Figure 6:
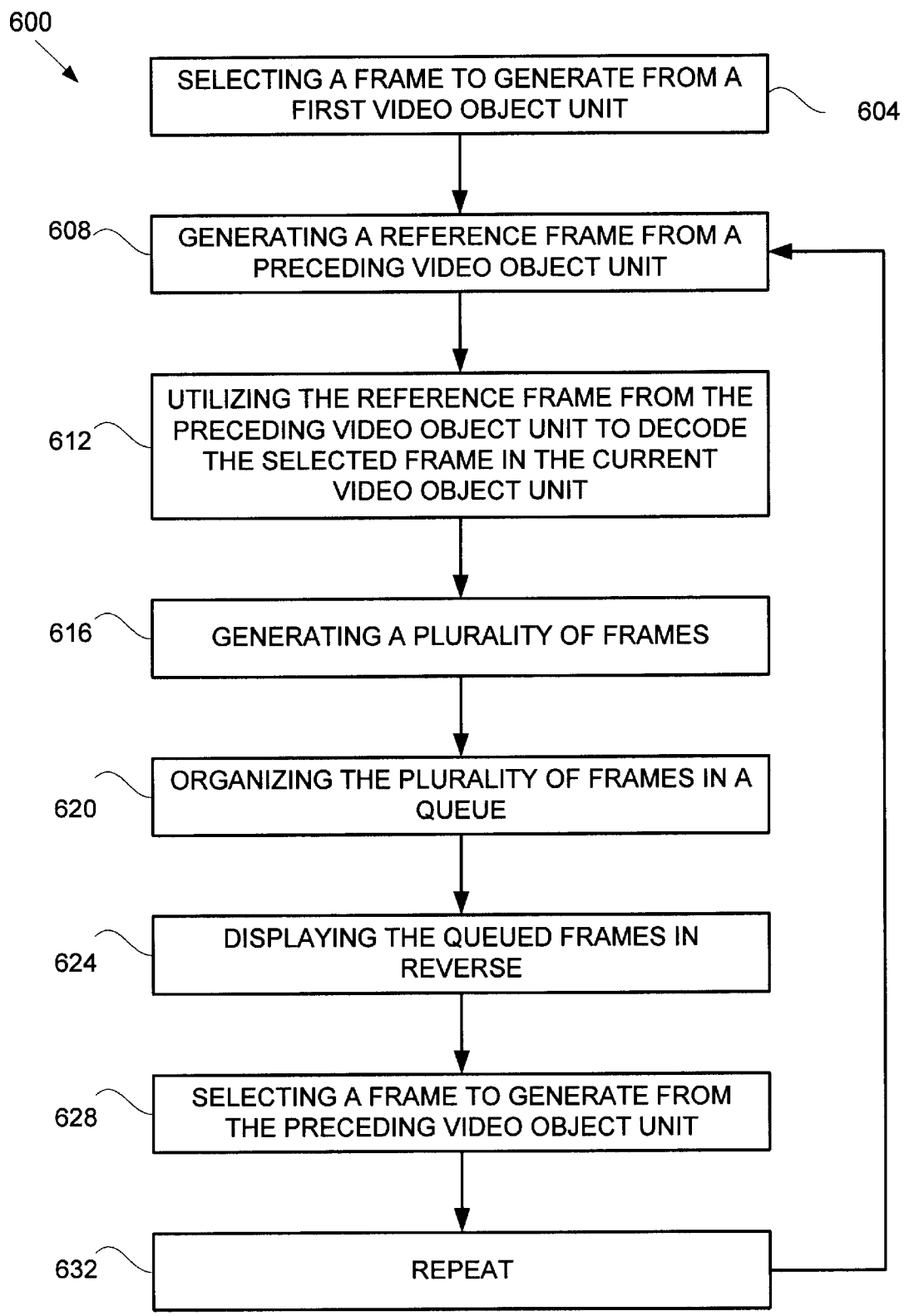
FIG. 6 shows a flowchart demonstrating the acts involved in generating a sequence of frames in a video object unit for reverse playback.

Referring now to FIG. 6, a method 600 for implementing one embodiment of the invention can be seen. This method is appropriate for implementation on a DVD player that decodes DVD video encoded in an MPEG format; however, it would be useful in other equipment that processes video streams as well. In FIG. 6, a frame from a first video object unit is selected so that the video frame can be generated 604. For purposes of this example, let this first frame be the frame information B0 in FIG. 4. Then, a reference frame from a preceding video object unit is generated 608, such as frame P11 in FIG. 4. This reference frame is then utilized to decode the selected reference frame B0 that is located in the current VOBU 612. As one would appreciate, it may be necessary to link back through several reference frames in order to generate the P11 reference frame. Namely, one would need to link back to P8, P5 and I2.

Once B0 is generated, then a second reference frame can be selected. Typically, this would be the next frame used in the forward play sequence. Hence, in referring to FIG. 4, this would be B1. As shown in FIG. 4, B1 also refers back to the reference frame P11. Thus, the process can be repeated to generate B1. The process is then repeated such that several frames are generated 616. This group of several frames is stored in memory to create a queue of frames. Then, the frames are output from memory in reverse order such that the video is played in reverse 624.

Figure 5:
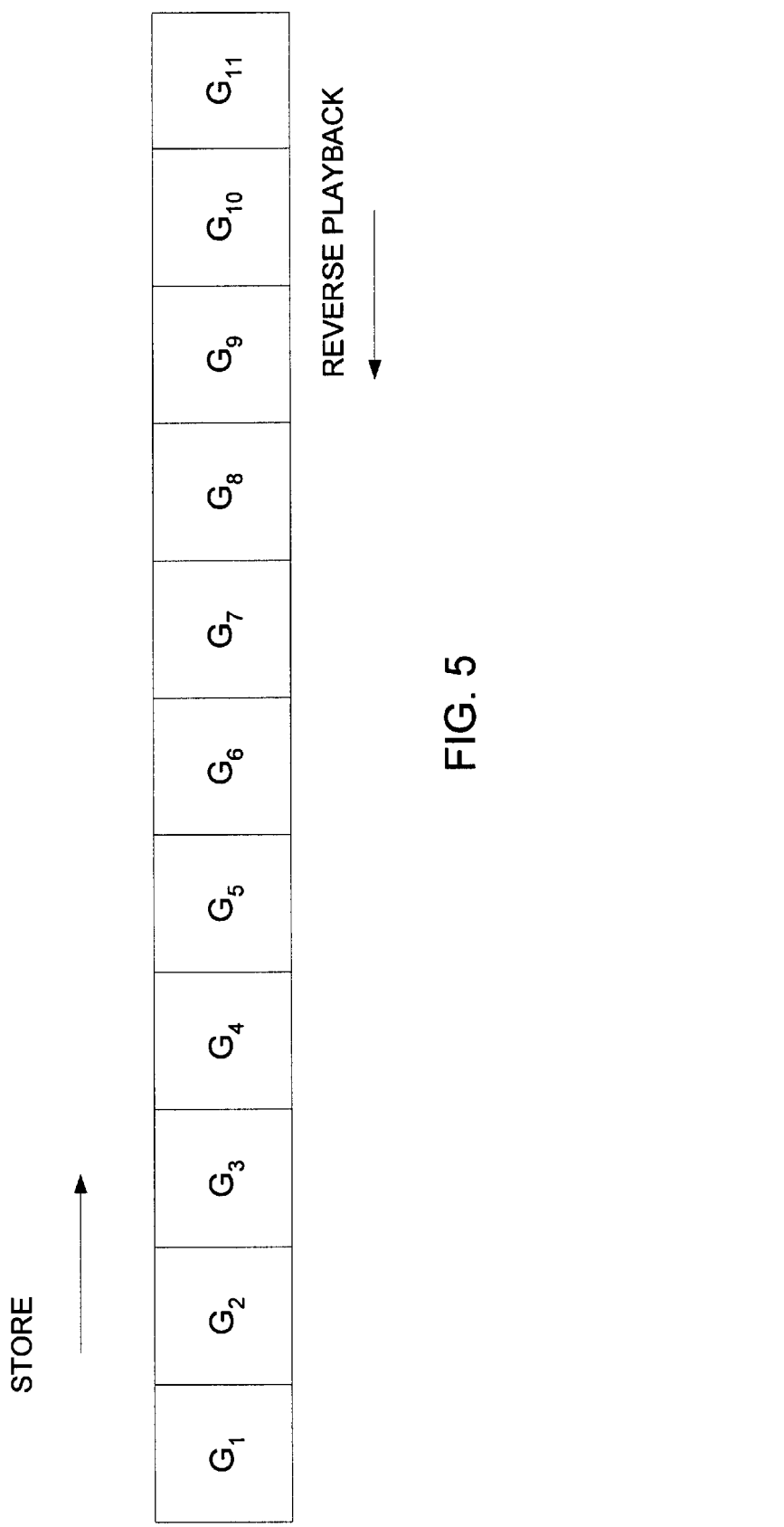
FIG. 5 shows a queue of frames that have been generated for reverse playback, and arrows designating the sequence in which the frames are stored and played in reverse.

This output from the queue can be seen by reference to FIG. 5. FIG. 5 shows that a group of frames are decoded and stored in memory as a queue of frames G1–G11. In normal play, this queue of frames would be played in order from G1 to G11. However, to generate a reverse play of the VOBU, the queue is output as G11 to G1. Thus, the stored queue of frames allows the frames to be played at normal speed, but in reverse. This is advantageous over existing designs in that the existing designs are not able to play at normal speed. Rather, they often must play at ½ speed so that they can take time to generate the next frame to be displayed in reverse.

Once a group of frames has been queued and the output has begun, a next group of frames can be decoded and queued in the same manner 632. This allows the reverse playback to continue once the output from the first queue is exhausted. In this way, the reverse playback can continue until the user indicates that it should stop.

Figure 7:
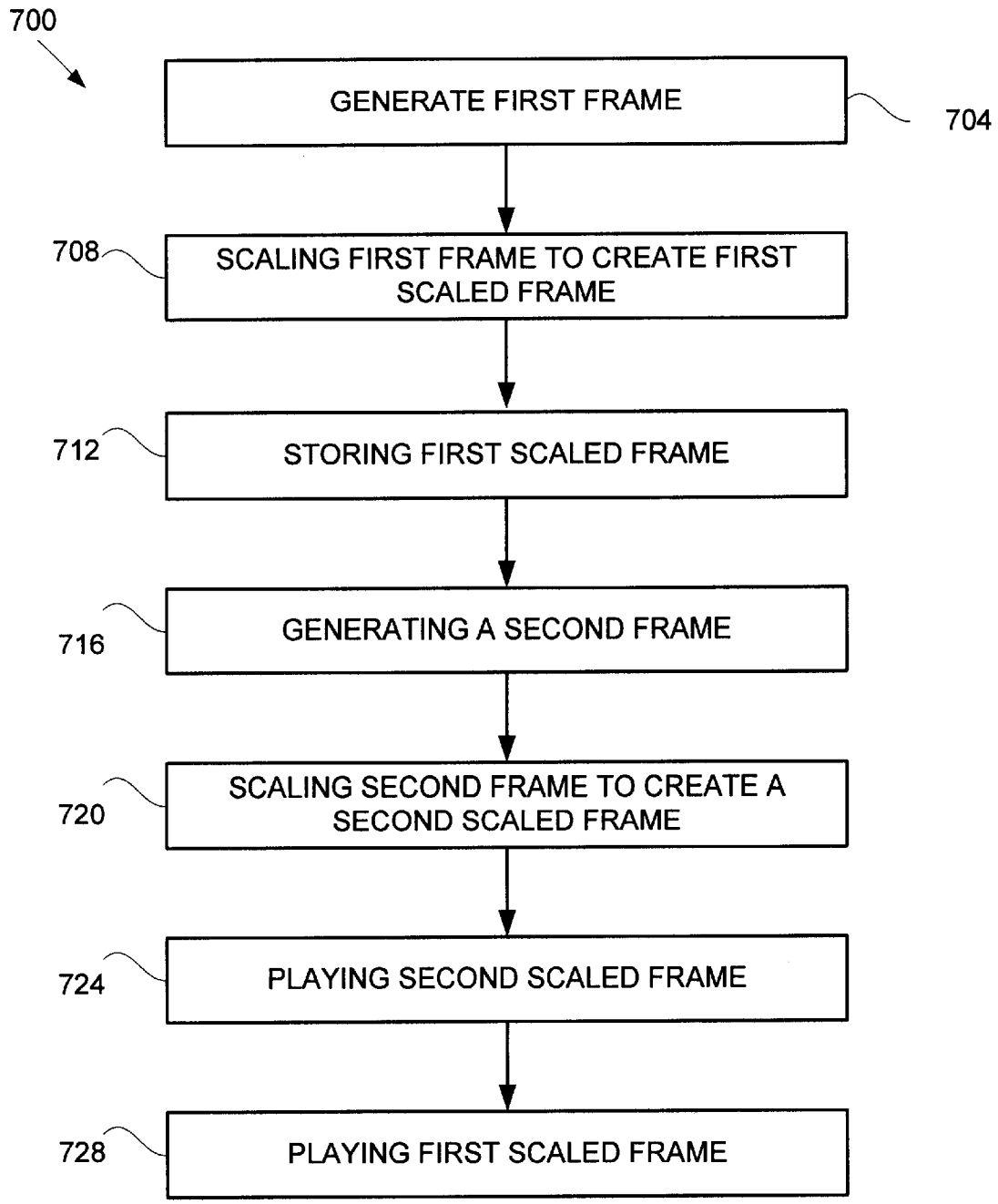
FIG. 7 shows a flowchart demonstrating a scaling algorithm.

When memory is limited, it is more difficult to implement the scheme outlined above, because there will not be enough memory to store all of the memory intensive video images in the queue. Hence, one embodiment of the invention provides for scaling the images so that less memory is required. This can be seen by reference to the method 700 of FIG. 7. In FIG. 7, a first frame is generated 704 as a full normal forward play image . It is then scaled or compressed to a smaller size or a size that requires less memory so as to create a scaled frame. In FIG. 4, a scaled image of B0 would be created. Once this scaled image is created, it is stored 712, e.g., in a queue. The full size image of B0 can be discarded at this point; however, if a full size image of I2 had been generated it would need to be saved for the decoding of successive frames. Consequently, a second frame B1 is generated 716 and scaled to create a second scaled frame 720. It is then stored in the queue for later playback. Finally, when the queue is complete, the stored scaled images are played back in reverse order from normal forward play order. Hence, the second scaled frame is played 724 followed by a playing of the first scaled frame 728. In this way, the scaling of the images allows more images to be stored in memory. Because this queue of images can be stored in memory, they can be played in reverse at a speed equal to normal forward play. This is an advantage over conventional circuits, some of which can only play in reverse at ½ normal forward speed. It is also advantageous in that the video can be played in reverse at normal speed without needing to eliminate any of the intervening frames so as to allow normal speed reverse.

Figure 8:
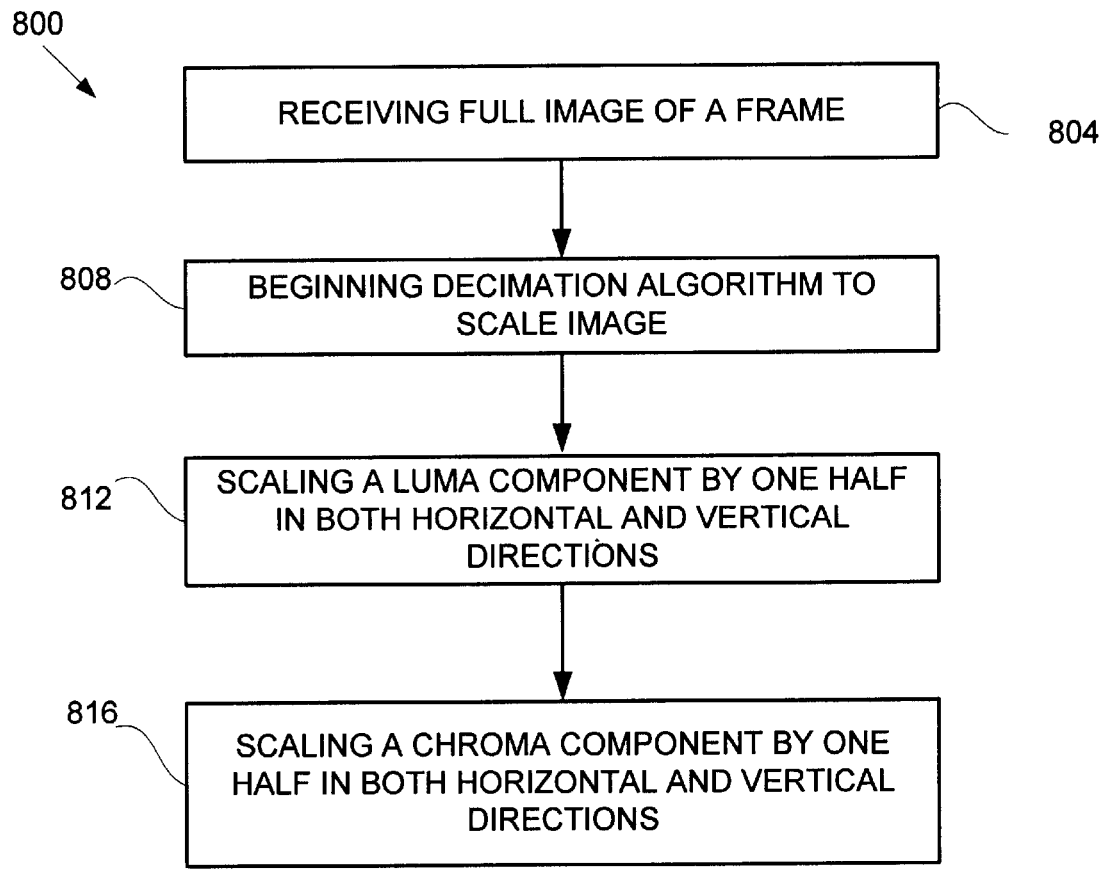
FIG. 8 shows a flowchart demonstrating the generation of a queue of frames for playback and the initiation of generating additional frames from a preceding video object unit while the queued frames are being output.

To accomplish the scaling of the various frames, a scaling routine can be utilized. The general goal of such a scaling routine is to produce a representation of the full frame of video information that requires less memory for storage. One such way to accomplish this is to employ a decimation algorithm that scales the full video image to a smaller size. FIG. 8 demonstrates a decimation algorithm that accomplishes this.

In the method of FIG. 8, one receives a full image of a frame 804. This would typically be the full image that is decoded, for example, by utilizing the B0, P11, P5 and I2 information to generate a full video image for display. The decimation algorithm is then employed to scale the full video image to a scaled image 808. To accomplish this, one scales a luma component of the frame to ½ of its full value in both the horizontal and vertical directions 812. Then, one scales the corresponding chroma component by ½ in both the horizontal and vertical directions 816. The scaling of the luma and chroma components is accomplished independently. The result is that the image is scaled to ¼ of its original size. The image can then be displayed, e.g., in the upper left hand quadrant of the screen.

Figure 9:
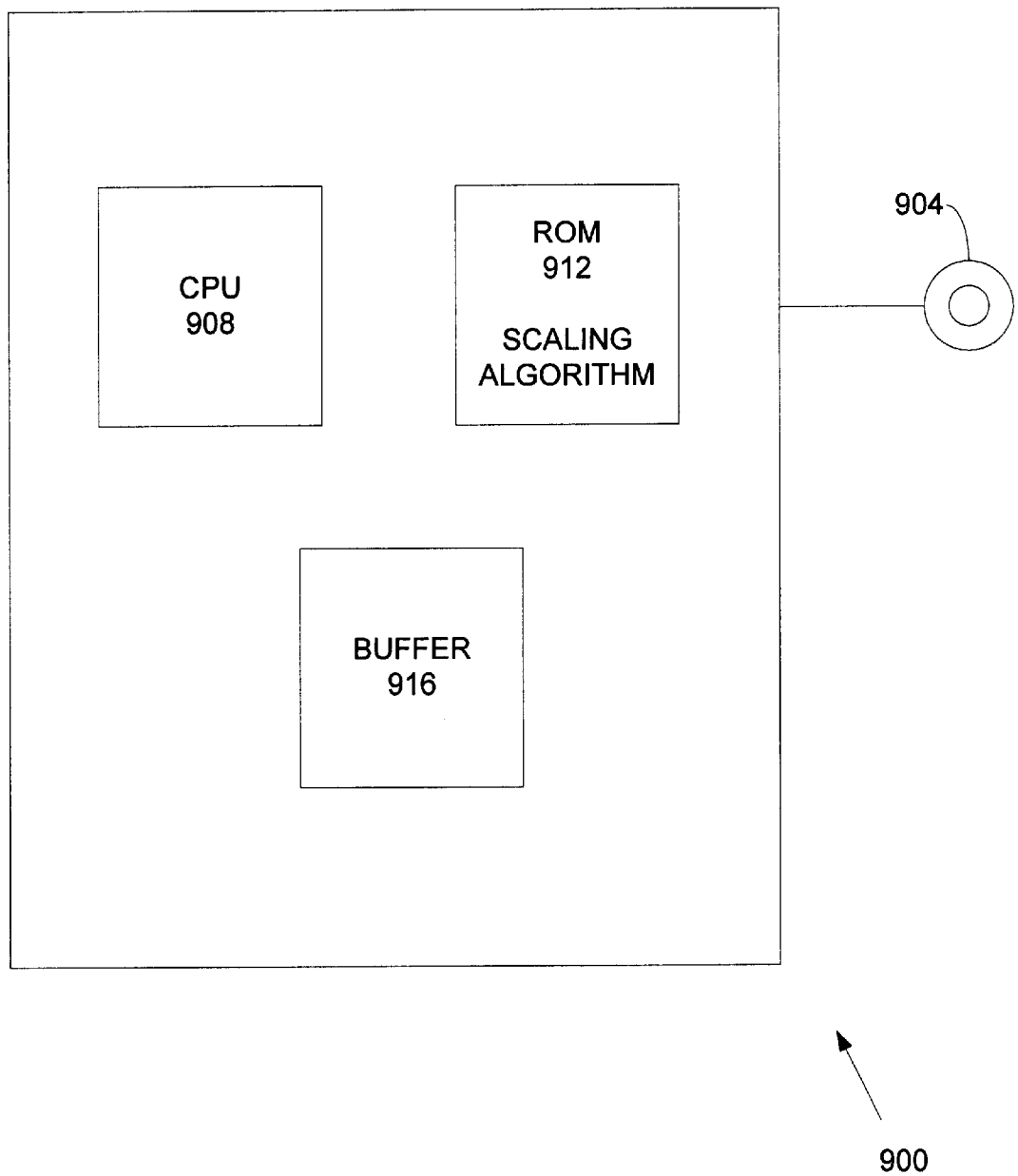
FIG. 9 shows a block diagram of a circuit useful for implementing the invention.

To accomplish the methods disclosed above, a circuit such as that shown in FIG. 9 can be used. The circuit 900 in FIG. 9 shows a DVD disk drive 904 coupled to a circuit 904, which can be an integrated circuit. Circuit 904 utilizes a processor, such as CPU 908 to process the video frame information. A scaling algorithm as described in FIG. 8 is stored in ROM, such as EEPROM, 912. Finally, a buffer or memory 916 is coupled to the CPU to store the frame images for playback. Once playback begins, the information stored in the buffer 916 is output for display on a video screen. In the embodiment where no scaling is required, the scaling algorithm stored in ROM 912 would not be necessary.

Figure 10:
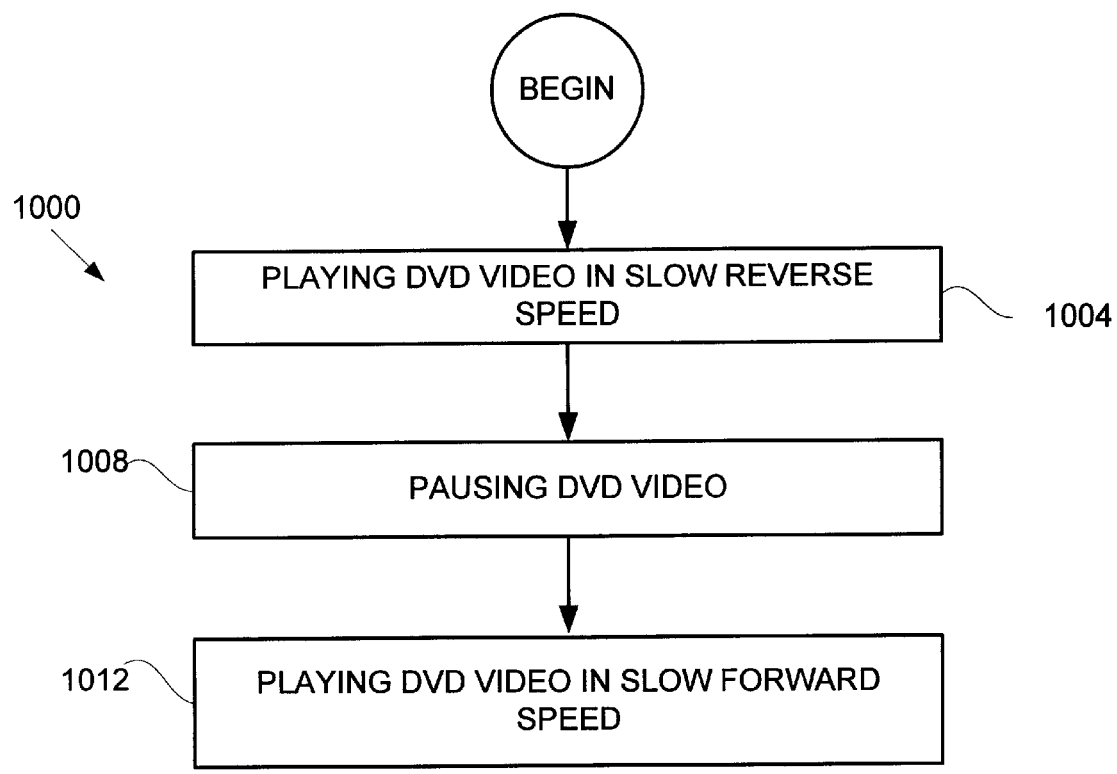
FIG. 10 shows a flowchart for playing a video in slow reverse and making the transition to pause and slow forward play.

Another embodiment of the invention provides for a transition between slow reverse speed, pause, and slow forward speed. These modes of playback are often referred to as "trick modes" in the DVD industry. As the method 1000 in the flowchart of FIG. 10 illustrates, the invention can be used to play a DVD video in slow reverse speed 1004. One way to accomplish this would be to generate the queue of images for reverse playback as illustrated above. These images could then be played back at a speed less than normal reverse speed. When the pause feature is engaged by a user, the sequencing of images in the reverse playback of the images would pause 1008. Thus, the current image would be displayed continuously until the slow-forward mode was engaged. At that point in time, the stored frames of images in the queue could be output to the display at a speed in accordance with slow forward 1012. Alternatively, the information for a frame could be regenerated and displayed at the slow forward rate. Such a feature is highly desirable in the DVD environment where users like to have control over the selection of playback speeds. Hence, the ability to smoothly transition between reverse and forward when trying to focus on a specific frame would greatly enhance the viewing of a DVD video. This method could be implemented by software that implemented the method of FIG. 10 with the circuit of FIG. 9. Further information can be seen by reference to "DVD Demystified" by Jim Taylor, McGraw Hill publisher, copyright 1998, the content of which is hereby incorporated by reference in its entirety for all that it discloses.

In addition to embodiments where the invention is accomplished by hardware, it is also noted that these embodiments can be accomplished through the use of an article of manufacture comprised of a computer usable medium having a computer readable program code embodied therein, which causes the enablement of the functions and/or fabrication of the hardware disclosed in this specification. For example, this might be accomplished through the use of hardware description language (HDL), register transfer language (RTL), VERILOG, VHDL, or similar programming tools, as one of ordinary skill in the art would understand. Therefore, it is desired that the embodiments expressed above also be considered protected by this patent in their program code means as well.

It is also noted that many of the structures and acts recited herein can be recited as means for performing a function or steps for performing a function, respectively. Therefore, it should be understood that such language is entitled to cover all such structures or acts disclosed within this specification and their equivalents.

It is thought that the apparatuses and methods of the embodiments of the present invention and many of its attendant advantages will be understood from this specification and it will be apparent that various changes may be made in the form, construction and arrangement of the parts thereof without departing from the spirit and scope of the invention or sacrificing all of its material advantages, the form herein before described being merely exemplary embodiments thereof.

What is claimed is:

1. A method of playing a video in reverse, comprising:
   generating a first reference frame in a current video object unit based upon a first video frame in a previous video object unit;
   generating a second reference frame in the current video object based upon at least a video frame in the previous video object unit, wherein the second reference frame is a next frame used in a forward play sequence; storing the first and the second reference frames in a queue; and
   outputting the stored frames in reverse order.

2. The method as described in claim 1 and further comprising: using a decimation algorithm to scale said at least said fist reference frame.

3. The method as described in claim 2 wherein said first reference frame comprises a Luma component and a Chroma component and further comprising:
   decimating said luma component separately from decimating said chroma component.

4. The method as described in claim 3 and further comprising: scaling said Luma component by ½ in both the horizontal and vertical directions.

5. The method as described in claim 3 and further comprising: scaling said Chroma component by ½ in both the horizontal and vertical directions.

6. The method as described in claim 1 wherein said first video frame is a P type video frame.

7. The method as described in claim 1 wherein said first video frame is an I type video frame.

8. An apparatus for playing a video in reverse, said apparatus comprising:
   a memory to store a plurality of frames of a video;
   a processor operable for decoding an encoded version of said plurality of frames;
   means for generating a first reference frame in a current video object unit based upon a first video frame in a previous video object unit;
   means for generating a second reference frame in the current video object based upon at least a video frame in the previous video object unit, wherein the second reference frame is a next frame used in a forward play sequence;

means for storing the first and the second reference frames in a queue;

means for outputting the stored frames in reverse order; and means for decimating at least one of said plurality of frames so as to create at least one decimated frame.

9. The apparatus as described in claim 8 and further comprising: a buffer operable for storing said at least one decimated frame.

10. The apparatus as described in claim 9 and further comprising: a means for playing a pluraity of decimated frames in reverse order from a forward order of playing said video.

11. The apparatus as described in claim 8 wherein said means for decimating comprises:

a means for scaling a luma component of a frame to ½ of said luma component when said frame is used to display said video in the forward direction.

12. An apparatus as described in claim 8 wherein said means for decimating comprises:

a means for scaling a chroma component of a frame to ½ of said chroma component when said frame is used to display said video in the forward direction.

* * * * *

UNITED STATES PATENT AND TRADEMARK OFFICE
CERTIFICATE OF CORRECTION

PATENT NO.     : 6,804,449 B1
DATED          : October 12, 2004
INVENTOR(S)    : Pratish R. Desai It is certified that error appears in the above-identified patent and that said Letters Patent is hereby corrected as shown below:

Column 6,
Line 39, change "said fist" to -- said first --.

Column 7,
Line 11, change "pluraity of" to -- plurality of --.

Signed and Sealed this

Eighteenth Day of January, 2005

JON W. DUDAS
*Director of the United States Patent and Trademark Office*